(12) United States Patent
Yanagisawa et al.

(10) Patent No.: US 8,073,024 B2
(45) Date of Patent: Dec. 6, 2011

(54) WAVELENGTH CONVERSION LASER DEVICE

(75) Inventors: Takayuki Yanagisawa, Tokyo (JP); Yoshihito Hirano, Tokyo (JP); Shuhei Yamamoto, Tokyo (JP); Yasuharu Koyata, Tokyo (JP)

(73) Assignee: Mitsubishi Electronics Corporation, Tokyo (JP)

( * ) Notice: Subject to any disclaimer, the term of this patent is extended or adjusted under 35 U.S.C. 154(b) by 0 days.

(21) Appl. No.: 12/671,458

(22) PCT Filed: Jul. 30, 2007

(86) PCT No.: PCT/JP2007/064850
§ 371 (c)(1),
(2), (4) Date: Jan. 29, 2010

(87) PCT Pub. No.: WO2009/016709
PCT Pub. Date: Feb. 5, 2009

(65) Prior Publication Data
US 2010/0202477 A1    Aug. 12, 2010

(51) Int. Cl.
*H01S 3/10* (2006.01)
(52) U.S. Cl. .......................................... 372/22
(58) Field of Classification Search .............. 372/22
See application file for complete search history.

(56) References Cited

U.S. PATENT DOCUMENTS

| 4,910,740 A | 3/1990 | Oka |
| 5,249,190 A | 9/1993 | Kortz et al. |
| 5,377,212 A | 12/1994 | Tatsuno et al. |
| 2003/0160034 A1* | 8/2003 | Filgas et al. ............ 219/121.68 |
| 2004/0240494 A1* | 12/2004 | Yamada et al. .................. 372/23 |
| 2006/0256829 A1 | 11/2006 | Koyata et al. |

FOREIGN PATENT DOCUMENTS

EP    0 596 714 A1    5/1994
(Continued)

OTHER PUBLICATIONS

U.S. Appl. No. 12/675,125, filed Feb. 25, 2010, Yamamoto, et al.

(Continued)

*Primary Examiner* — Patrick Stafford
(74) *Attorney, Agent, or Firm* — Oblon, Spivak, McClelland, Maier & Neustadt, L.L.P.

(57) ABSTRACT

A wavelength conversion laser device includes a solid-state laser element having a waveguide structure including a laser medium that amplifies laser beams by providing a gain generated due to absorption of pump light to the laser beams and outputs a fundamental wave, and a wavelength conversion element having a waveguide structure including a nonlinear optical material that converts a part of a fundamental wave output from the solid-state laser element to a second harmonic, to resonate the fundamental wave by an optical resonator structure including the solid-state laser element and the wavelength conversion element and outputs a second harmonic from the wavelength conversion element. The solid-state laser element outputs a linearly polarized fundamental wave, and differentiates a polarization state of a fundamental wave having passed through the wavelength conversion element and entering into the solid-state laser element from linear polarization output from the solid-state laser element, so that wavelength conversion efficiency of the wavelength conversion element is not decreased in a peak wavelength of a gain band.

6 Claims, 9 Drawing Sheets

FOREIGN PATENT DOCUMENTS

| | | |
|---|---|---|
| JP | 1 220879 | 9/1989 |
| JP | 05-167165 A | 7/1993 |
| JP | 6 132596 | 5/1994 |
| JP | 6 224508 | 8/1994 |
| JP | 7 226561 | 8/1995 |
| JP | 8 8480 | 1/1996 |
| JP | 08-8480 A * | 1/1996 |
| JP | 9 116219 | 5/1997 |
| JP | 2006 19603 | 1/2006 |
| WO | WO 00/14835 A1 | 3/2000 |

OTHER PUBLICATIONS

U.S. Appl. No. 12/677,827, filed Mar. 12, 2010, Koyata, et al.

Masao Imaki et al., "Diode Proximity-Coupled Nd:GdVO$_4$ Planar Waveguide Laser", Lasers and Electro-Optics and 2006 Quantum Electronics and Laser Science Conference, CLEO/QELS 2006, May 21, 2006, XP 031394253, 2 Pages.

* cited by examiner

WAVELENGTH CONVERSION LASER DEVICE

TECHNICAL FIELD

The present invention relates to a wavelength conversion laser device that outputs laser beams of a predetermined wavelength by performing wavelength conversion of a fundamental wave generated by a laser medium.

BACKGROUND ART

Recently, as a light source of an optical information processing technology, for example, research and development of a visible light laser such as green light laser and blue light laser are under way. As a type of visible light lasers, a wavelength conversion laser device that applies a wavelength conversion technique to make near infrared laser beams have a shorter wavelength has been known. Generally, in the wavelength conversion laser device, a wavelength conversion element made of a nonlinear optical material is provided inside or outside of an optical resonator of a semiconductor laser or a solid-state laser, and laser beams (fundamental waves) generated by the optical resonator are propagated to the wavelength conversion element, thereby outputting a second harmonic, which is wavelength-converted to half a wavelength (a double frequency) with respect to the fundamental waves.

At this time, an oscillation wavelength bandwidth of the optical resonator needs to be matched with a phase matching width of the wavelength conversion element. However, the phase matching width of the wavelength conversion element is generally very narrow, and an output of the wavelength conversion laser device fluctuates due to its external environment. Therefore, to achieve wavelength conversion by the wavelength conversion element in a highly efficient manner, a coherent light source has been proposed as a wavelength conversion laser device having a configuration such that a light source wavelength is fixed within a tolerance of the wavelength conversion element so that it is not much affected by a change of the external environment (see, for example, Patent Document 1). In this conventional coherent light source, fundamental waves from the laser medium are converted to a harmonic by the wavelength conversion element, and the fundamental waves reflected by a reflector are returned to the laser medium, thereby fixing the oscillation wavelength of the laser medium to the wavelength of return light so that the oscillation wavelength of the laser medium is automatically fixed to a phase matching wavelength of the wavelength conversion element.

Patent Document 1: Japanese Patent Application Laid-open No. 2006-19603

DISCLOSURE OF INVENTION

Problem to be Solved by the Invention

In a wavelength conversion laser device of an internal wavelength conversion type including a laser medium and a wavelength conversion element in a pair of resonator mirrors, when internal wavelength conversion is performed by using a laser medium having a wider gain band than a phase matching band (a wavelength conversion band) of the wavelength conversion element, the fundamental waves are first laser-oscillated at a peak wavelength of the gain band, and wavelength conversion is performed by the wavelength conversion element at the peak wavelength of the gain band. However, a loss in the optical resonator at the peak wavelength of the gain band increases due to the wavelength conversion, thereby causing laser-oscillation at the wavelength of the gain band outside the phase matching band. As a result, the fundamental waves in the phase matching band decrease, thereby causing a problem that wavelength conversion efficiency by the wavelength conversion element is deteriorated. Furthermore, in Patent Literature 1, the oscillation wavelength of the laser medium is automatically fixed to the phase matching wavelength of the wavelength conversion element. However, as described above, because the phase matching band of the wavelength conversion element is generally narrower than the oscillation wavelength band (the gain band) of the laser medium, it has not been possible to suppress the laser-oscillation outside the phase matching band.

In view of the above problems, an object of the present invention is to achieve a wavelength conversion laser device in which even when laser-oscillation occurs at a peak wavelength of a gain band of a laser medium to perform wavelength conversion, wavelength conversion efficiency by a wavelength conversion element at the peak wavelength of the gain band does not decrease. Another object of the present invention is to achieve a wavelength conversion laser device in which, without adding any optical parts or large-scale optical parts, wavelength conversion efficiency by a wavelength conversion element at a peak wavelength of a gain band does not decrease.

Means for Solving Problem

In order to attain the above object, in a wavelength conversion laser device of the present invention including a solid-state laser element having a waveguide structure including a laser medium that amplifies laser beams by providing a gain generated due to absorption of pump light to the laser beams and outputs a fundamental wave and a wavelength conversion element having a waveguide structure including a nonlinear optical material that converts a part of a fundamental wave output from the solid-state laser element to a second harmonic, the wavelength conversion laser device resonates a fundamental wave by an optical resonator structure including the solid-state laser element and the wavelength conversion element and outputs a second harmonic from the wavelength conversion element, and the solid-state laser element outputs a linearly polarized fundamental wave. Additionally, the wavelength conversion laser device further includes a filter unit that differentiates a polarization state of a fundamental wave having passed through the wavelength conversion element and entering into the solid-state laser element from linear polarization output from the solid-state laser element.

EFFECT OF THE INVENTION

According to the present invention, an oscillation wavelength width of fundamental wave is made narrow near a peak wavelength of a gain band of a laser medium, to be substantially the oscillation wavelength width of the fundamental wave. Accordingly, even when wavelength conversion by a wavelength conversion element is performed at the peak wavelength of the laser medium, and a loss in an optical resonator at the peak wavelength increases, laser-oscillation of the fundamental wave outside the wavelength conversion band (substantially equal to the oscillation wavelength width of the fundamental wave) does not occur. As a result, efficient wavelength conversion of the fundamental wave can be performed in the wavelength conversion band of the wavelength conversion element.

EXPLANATIONS OF LETTERS OR NUMERALS 10, 10A, 10B wavelength conversion laser device
11 semiconductor laser
12 solid-state laser element
13 wavelength conversion-filter element
13A wavelength conversion element
14 ½ wavelength plate
15 ¼ wavelength plate
111, 123a, 123b, 133a, 133b, 151 facet
121 laser medium
122, 132 clad
131 nonlinear optical material

BEST MODE(S) FOR CARRYING OUT THE INVENTION

Exemplary embodiments of a wavelength conversion laser device according to the present invention will be explained below in detail with reference to the accompanying drawings. The present invention is not limited to the embodiments. In addition, perspective views of a wavelength conversion laser device in the following embodiments are shown schematically, and a relation between the thickness and width of a layer and a ratio of the thickness of respective layers are different from actual products.

First Embodiment

Figure 1:
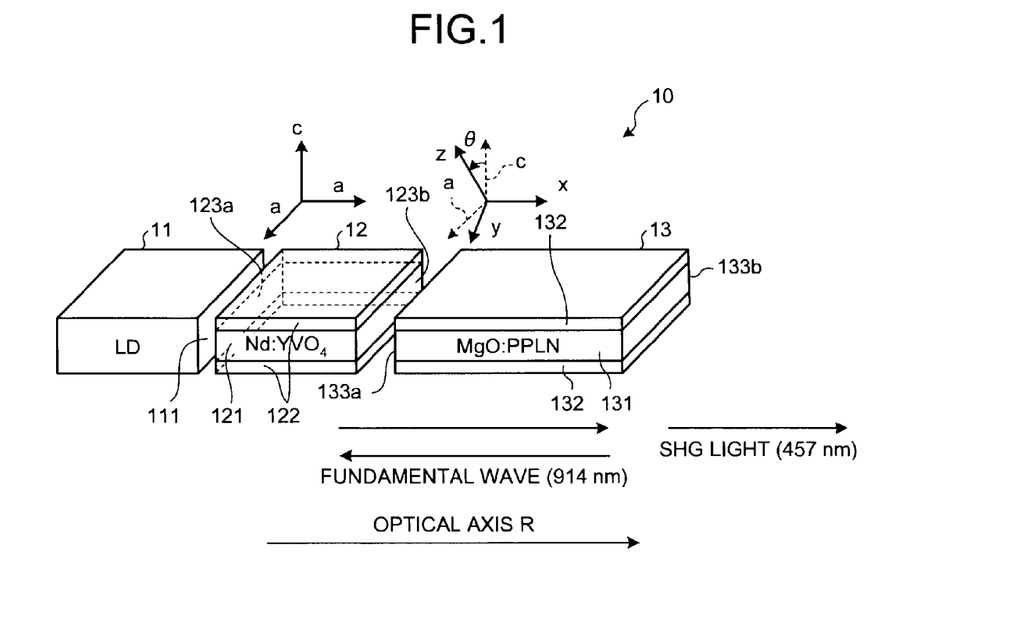
FIG. 1 is a perspective view schematically depicting a configuration of a wavelength conversion laser device according to a first embodiment of the present invention.

FIG. 1 is a perspective view schematically depicting a configuration of a wavelength conversion laser device according to a first embodiment of the present invention. It is assumed that a direction of R shown in FIG. 1 is an optical axis indicating an oscillating direction of laser beams. A wavelength conversion laser device 10 includes a semiconductor laser 11 as an pump light source, a solid-state laser element 12 that performs oscillation as well as amplification of laser beams, which become fundamental waves, using laser beams output from the semiconductor laser 11 as pump light, and a wavelength conversion-filter element 13 that converts laser beams of fundamental waves output from the solid-state laser element 12 to second harmonics of half the wavelength and has a function of a birefringent filter.

The semiconductor laser 11 outputs pump light for pumping the solid-state laser element 12. An emission-side facet 111 of laser beams of the semiconductor laser 11 is provided to face a facet 123a of a laser medium 121 of the solid-state laser element 12. It is assumed that the semiconductor laser 11 is made of a compound semiconductor material that outputs laser beams having a wavelength of 808 nanometers.

The solid-state laser element 12 has a tabular shape, and facets 123a and 123b vertical to the optical axis R are in a rectangular shape. The solid-state laser element 12 has an optical waveguide structure. The solid-state laser element 12 absorbs pump light from the semiconductor laser 11, forms an inverted distribution state to propagate laser beams generated by induced emission in a direction of the optical axis R, and outputs linear polarization vibrating from the facet 123b in a predetermined direction. Specifically, the solid-state laser element 12 includes the tabular laser medium 121 that absorbs pump light to generate induced emission and a clad 122 joined to at least one face of upper and lower faces of the laser medium 121. The laser medium 121 is made of a birefringent material (preferably, a material including an optically uniaxial crystal), and a c-axis (crystalline axis) thereof is arranged in a thickness direction in FIG. 1, one of a-axes (crystal axes) is arranged in the same direction as the optical axis R, and the other a-axis is arranged in a plane vertical to the optical axis R. The c-axis matches an optic axis, which is in a direction having only one speed of light wave (a refractive index) in the material.

Because the oscillating direction of laser beams is the direction of the optical axis R and there are the a-axis and c-axis of the laser medium 121 in the plane vertical to the optical axis R, laser beams moving in the direction of the optical axis R in the laser medium 121 move in a manner branched into TM (transverse magnetic) polarization (also referred to as extraordinary light) in which a plane of vibration is present in a plane formed by the c-axis and the optical axis R and TE (transverse electric) polarization (also referred to as ordinary light) in which the plane of vibration is present in a plane vertical to the plane formed by the c-axis and the optical axis R and includes the optical axis R. Because a refractive index ne of the laser medium 121 with respect to TM polarization and a reflective index no of the laser medium 121 with respect to TE polarization are different from each other in a case of the birefringent material, laser beams output from the solid-state laser element 12 can be linear polarization by using a material having a refractive index nc present in a range between ne and no as the clad 122.

It is assumed that the solid-state laser element 12 is formed of the laser medium 121 including Nd:YVO$_4$ (refractive index: from ne to 2.17 and from no to 1.96 in a wavelength of 914 nanometers), which absorbs the pump light of 808 nanometers from the semiconductor laser 11 and outputs laser beams of 914 nanometers, and the clad 122 including Ta$_2$O$_5$ (refractive index: from ne to 2.08 in the wavelength of 914 nanometers) joined to at least one of the upper or lower surfaces of the laser medium 121.

Because TE polarization subjected to the refractive index no, which is smaller than the refractive index nc of the clad 122 generated by the laser medium 121, does not satisfy a total reflection condition on an interface between the laser medium 121 and the clad 122 due to the above structure, TE polarization becomes a radiation mode in which light leaks to the clad 122, thereby causing a large loss. However, TM polarization subjected to the refractive index ne, which is larger than the refractive index of the clad 122, in the laser medium 121 satisfies the total reflection condition on the interface between the laser medium 121 and the clad 122, and is confined in the laser medium 121 to propagate in the optical waveguide in the direction of the optical axis R. As a result, beams output from the solid-state laser element 12 become linear polarization (fundamental waves) in a TM mode. That is, the solid-state laser element 12 outputs the fundamental waves that vibrate in a thickness direction (a c-axis direction).

The wavelength conversion-filter element 13 has a tabular shape, and facets 133a and 133b thereof perpendicular to the optical axis R are, for example, in a rectangular shape. The wavelength conversion-filter element 13 also has a function of a birefringent filter that converts a wavelength of a part of the fundamental waves output from the solid-state laser element 12 to a second harmonic having half the wavelength and filters the remaining fundamental waves traveling back and forth in the wavelength conversion-filter element 13 and entering into the solid-state laser element 12. A nonlinear optical material having a cyclic polarization inversion structure such as MgO:PPLN (periodically poled lithium niobate) or PPLT (periodically poled lithium tantalate) can be used as the wavelength conversion-filter element 13. The wavelength conversion-filter element 13 also has the optical waveguide structure, in which a clad 132 having a refractive index smaller than that of a nonlinear optical material 131 can be joined to both or at least one of upper or lower surfaces of the nonlinear optical material 131 or air can be used as the clad.

It is assumed that hexagonal MgO:PPLN is used as the nonlinear optical material 131, and Ta$_2$O$_5$ having a lower refractive index than that of the PPLN with respect to TM polarization and TE polarization is used on one surface of the clad 132 and SiO$_2$ is used on the other surface thereof. Accordingly, because TM polarization and TE polarization having entered into the nonlinear optical material 131 of the wavelength conversion-filter element 13 satisfy the total reflection condition, TM polarization and TE polarization propagate in the wavelength conversion-filter element 13 in a waveguide mode.

The c-axis (which is the crystalline axis and also the optic axis) of the nonlinear optical material (MgO:PPLN) 131 constituting the wavelength conversion-filter element 13 is expressed below as a z-axis for distinguishing it from the c-axis of the laser medium 121. The a-axis (crystalline axis) parallel to the optical axis R is expressed as an x-axis, and a direction vertical to the z-axis and x-axes is expressed as a y-axis.

The first embodiment is characterized such that the z-axis (crystalline axis and optic axis) of the nonlinear optical material 131 is arranged in a plane vertical to the optical axis R with an inclination of angle θ with respect to the c-axis of the laser medium 121 so that the wavelength conversion-filter element 13 has a function as the birefringent filter as well as the wavelength conversion function. An external shape of the wavelength conversion-filter element 13 is cut in a tabular shape (a hexahedral shape) in a state with the z-axis being inclined with respect to the c-axis of the laser medium 121. That is, sides of the wavelength conversion-filter element 13 vertical to the optical axis R are parallel to the a-axis and the c-axis, which are not parallel to the optical axis R of the laser medium 121, and the directions of these sides do not match the direction of the y-axis and the z-axis of the nonlinear optical material 131.

An optical film that transmits pump light and totally reflects fundamental laser beams is formed on the facet 123a of the solid-state laser element 12 on the semiconductor laser 11 side, and a reflection preventing film that transmits the fundamental laser beams is formed on the facet 123b of the solid-state laser element 12 on the wavelength conversion-filter element 13 side. An optical film that transmits the fundamental laser beams and reflects the second harmonic laser beams is formed on the facet 133a of the wavelength conversion-filter element 13 on the solid-state laser element 12 side, and an optical film that totally reflects the fundamental laser beams and transmits the second harmonic laser beams is formed on the facet 133b of the wavelength conversion-filter element 13 on a second-harmonic emitting side. These total reflection films and optical films are formed by laminating, for example, dielectric thin films.

As described above, the nonlinear optical material 131 has the function as the birefringent filter as well as the function as the wavelength conversion-filter element 13, by inclining the z-axis of the nonlinear optical material 131 of the wavelength conversion-filter element 13 by the angle θ with respect to the c-axis of the laser medium 121 in the plane vertical to the optical axis R.

An operation of the wavelength conversion laser device is explained next, focusing on the function as the birefringent filter of the nonlinear optical material 131. Pump light having a wavelength of 808 nanometers is output from the facet 111 of the semiconductor laser 11 and enters into the facet 123a of the laser medium 121 in the solid-state laser element 12. The inverted distribution state is formed in the laser medium 121 by the pump light, and the laser medium 121 becomes a mode in which spontaneously emitted light emitted in the direction of the optical axis R resonates, and the light is amplified by induced emission. The light travels back and forth between the facet 123a of the laser medium 121 and the facet 133b of the wavelength conversion-filter element 13 (optical resonator). However, when a gain by amplification at the time of going around by the optical resonator is balanced with a loss caused at the time of going around by the optical resonator, laser beams having a wavelength of 914 nanometers are laser-oscillated.

Because TE polarization of laser-oscillated laser beams does not satisfy the total reflection condition in the solid-state laser element 12, TE polarization is lost as a radiation mode, and only TM polarization is output from the facet of the laser medium 121. That is, laser beams output from the laser medium 121 becomes TM polarization in which laser beams are linearly polarized in the c-axis direction.

Laser beams output from the laser medium 121 enter into MgO:PPLN 131 in linear polarization in the c-axis direction. At this time, because the z-axis of MgO:PPLN 131 is inclined by the angle θ in the plane vertical to the optical axis R with respect to the c-axis of Nd:YVO$_4$ as the laser medium 121, linear polarization is separated into TM polarization (extraordinary light) vibrating in a z-axis direction and TE polarization (ordinary light) vibrating in a y-axis direction, and propagates in MgO:PPLN 131 while being subjected to different refractive indexes. Because MgO:PPLN 131 is the wavelength conversion-filter element 13, MgO:PPLN 131 converts a part of the fundamental waves to a second harmonic having a wavelength of 457 nanometers, which is half the wavelength of the fundamental waves, and outputs the second harmonic from the facet 133b. The fundamental waves, which have not been converted to the second harmonic, are totally reflected by the facet 133b to return in the same route.

In laser beams of the fundamental waves that have traveled back and forth in MgO:PPLN 131, passed through the facet 133a of MgO:PPLN 131, and returned to Nd:YVO$_4$ 121, only c-axis components are selected to enter into Nd:YVO$_4$ 121, and a-axis components become a loss. For example, in MgO:PPLN 131, in a case that there is no loss of laser beams, and a phase difference of laser beams vibrating and propagating in the z-axis direction and the y-axis direction is zero, beams emitted from the facet 133a of MgO:PPLN 131 are combined and return to the original linear polarization. On the other hand, when a phase difference occurs while laser beams travel back and forth in MgO:PPLN 131 or when different losses occur in the respective axial directions at the time of propagation, beams emitted from the facet 133a of MgO:PPLN 131 become elliptic polarization or circular polarization. In this case, polarization of the fundamental waves (polarization in the c-axis direction) is selected by Nd:YVO$_4$ 121, and components entering in an a-axis direction become a loss.

Specifically, because MgO:PPLN 131 becomes a high-order phase plate, a phase difference of laser beams traveling back and forth in MgO:PPLN 131 and vibrating and propagating, respectively, in the z-axis direction and the y-axis direction is different according to the wavelength. At this time, a wavelength interval Δλ with smallest loss is expressed by the following equation (1), where λ represents a wavelength of the fundamental waves output by the laser medium 121, Δn represents a difference in refractive index with respect to laser beams vibrating and propagating in the z-axis and y-axis directions, and L represents a crystal length of MgO:PPLN 131 in the direction of optical axis R:

$$\Delta\lambda = \lambda^2/2\Delta n L \quad (1)$$

For example, in MgO:PPLN 131 having a crystal length of L=4.0 millimeters, if the wavelength of laser beams of the fundamental waves is assumed to be λ=914 nanometers, Δn of MgO:PPLN 131 becomes Δn=ne−no=−0.083452. Therefore, Δλ=1.25 nanometers can be obtained from the equation (1). That is, the wavelength having the smallest loss appears periodically for every 1.25 nanometers.

Figure 2:
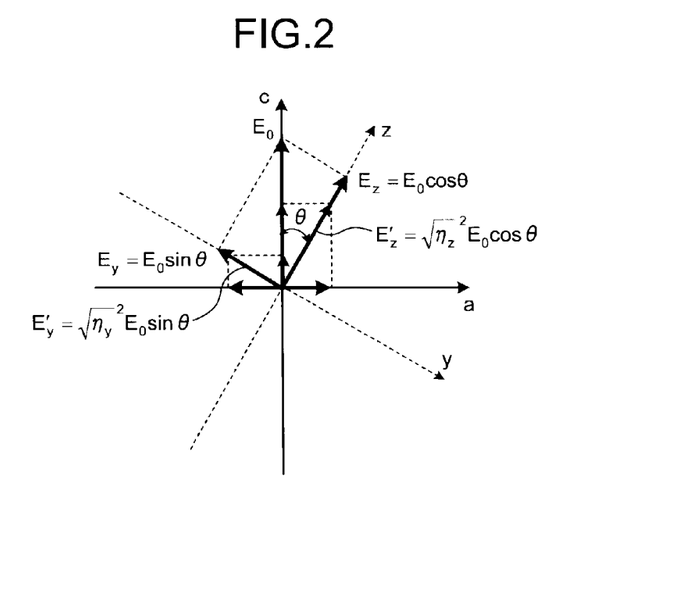
FIG. 2 depicts a relation between a field strength and an axial direction when laser beams having linear polarization in a c-axis direction travel back and forth in a nonlinear optical material.

FIG. 2 depicts a relation between a field strength and an axial direction when laser beams having linear polarization in the c-axis direction travel back and forth in the nonlinear optical material. The relation between the field strength and the axial direction (of a single pass) when electric field $E_0$ of laser beams output from Nd:YVO$_4$ 121 and linearly polarized in the c-axis direction enters into MgO:PPLN 131, travels back and forth therein once, and output from the facet is shown here. The a-axis and c-axis in FIG. 2 indicate orientation of the crystalline axis of the laser medium (Nd:YVO$_4$) 121, and the z-axis and y-axis respectively indicate orientation of the crystalline axis (c-axis) of the nonlinear optical material 131 and orientation of the axis vertical to the c-axis in the plane vertical to the optical axis R.

Because the strength of the electric field polarized in the c-axis direction, which enters into MgO:PPLN 131, is $E_0$, electric field components $E_y$ and $E_z$ in the y-axis direction and the z-axis direction immediately after entering into MgO:PPLN 131 are respectively expressed by the following equations (2) and (3), where θ represents an angle formed by the c-axis of Nd:YVO4 and the z-axis of MgO:PPLN 131 (hereinafter, "installation angle"):

$$E_y = E_0 \cos\theta \quad (2)$$

$$E_z = E_0 \sin\theta \quad (3)$$

When a intensity transmission factor in a single pass of the laser beams in the y-axis and z-axis directions is, respectively, $\eta_y$ and $\eta_z$, the electric field components $E_y$ and $E_z$ in the y-axis direction and the z-axis direction, which have entered into MgO:PPLN 131, traveled back and forth therein once, and emitted, are expressed, respectively, by the following equations (4) and (5), derived from the equations (2) and (3).

$$E_y' = \eta_y E_0 \cos\theta \quad (4)$$

$$E_z' = \eta_z E_0 \sin\theta \quad (5)$$

A calculation using Jones' matrix described later is required for a detailed polarization characteristic, taking wavelength dependency of a loss and the refractive index into consideration. However, the field strength in a condition in which the loss becomes the smallest (that is, a phase difference is zero) or the largest (that is, the phase difference is n) can be uniquely expressed, regardless of crystal properties. The electric field components ($E_c'$, $E_a'$) in a case that a loss of laser beams propagating from Nd:YVO$_4$ 121 to MgO:PPLN 131 and entering again into Nd:YVO$_4$ 121 is the smallest (a phase difference is zero) and the electric field components ($E_c'$, $E_a'$) in a case that the loss is the largest (a phase difference is n) are expressed respectively by the following equations (6) and (7), derived from the equations (4) and (5).

$$\begin{pmatrix} E_c' \\ E_a' \end{pmatrix} = \begin{pmatrix} E_0\left(\sqrt{\eta_z}^2 \cos^2\theta + \sqrt{\eta_y}^2 \sin^2\theta\right) \\ \left(\sqrt{\eta_z}^2 - \sqrt{\eta_y}^2\right) E_0 \cos\theta \sin\theta \end{pmatrix} \quad (6)$$

$$\begin{pmatrix} E_c' \\ E_a' \end{pmatrix} = \begin{pmatrix} E_0\left(\sqrt{\eta_z}^2 \cos^2\theta - \sqrt{\eta_y}^2 \sin^2\theta\right) \\ \left(\sqrt{\eta_z}^2 + \sqrt{\eta_y}^2\right) E_0 \cos\theta \sin\theta \end{pmatrix} \quad (7)$$

Figure 3A:
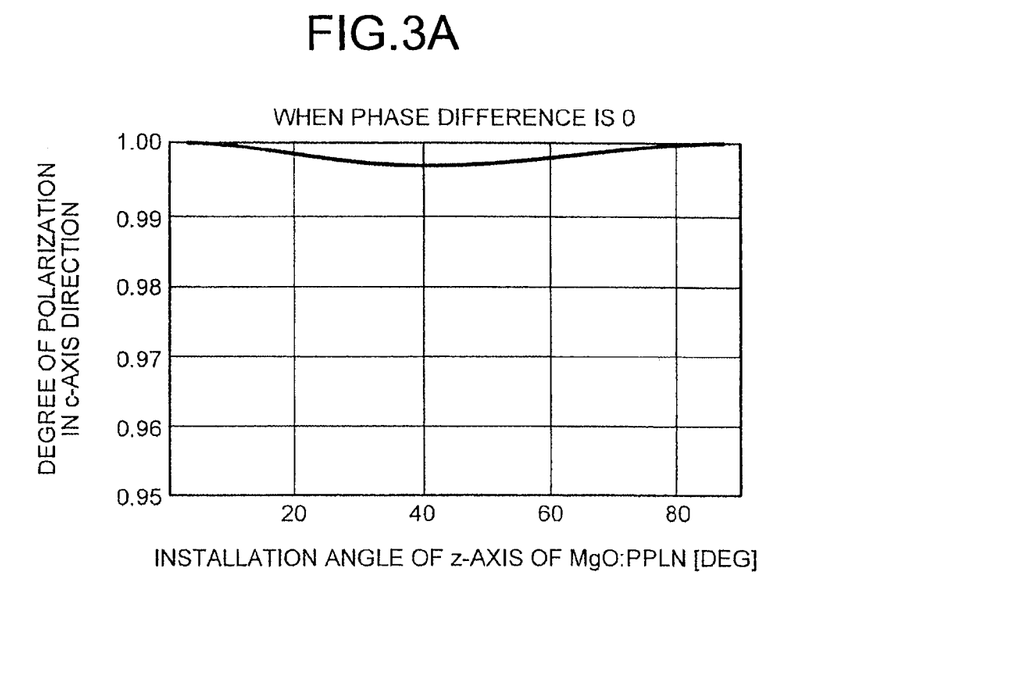
FIG. 3A depicts installation angle θ dependency of MgO:PPLN of a degree of polarization of laser beams in the c-axis direction after passing through MgO:PPLN.
Figure 3B:
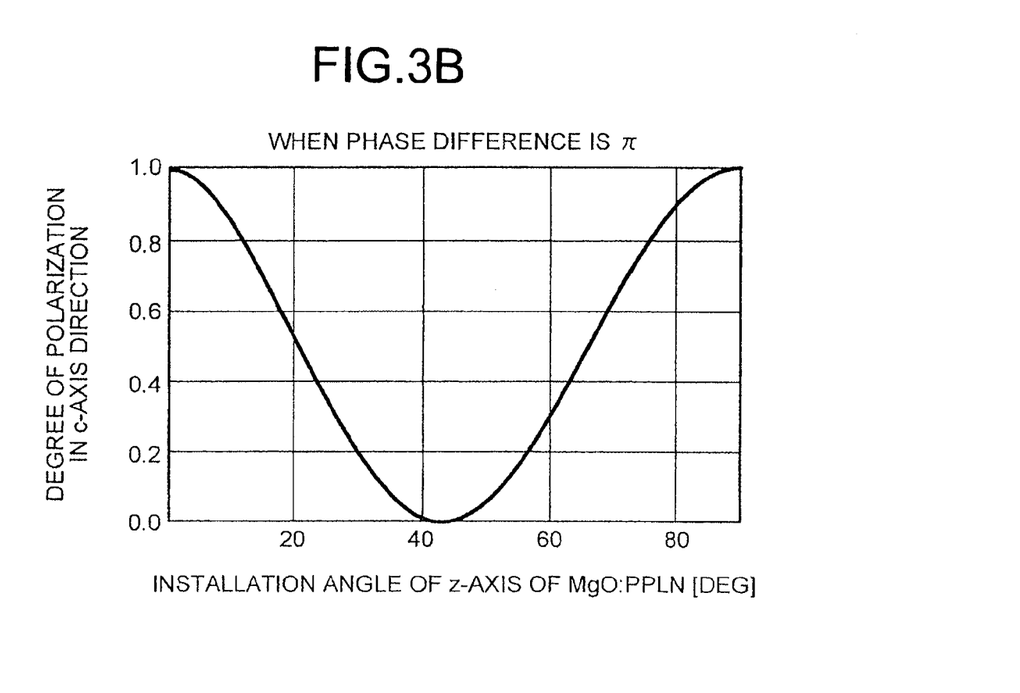
FIG. 3B depicts installation angle θ dependency of MgO:PPLN of a degree of polarization of laser beams in the c-axis direction after passing through MgO:PPLN.

In a case of the phase difference being 0 in the equation (6) and in a case of the phase difference being π in the equation (7), it is understood that the loss, that is, components $E_a'$ entering into the a-axis of Nd:YVO$_4$ 121 increases as a difference between intensity transmission factors $\eta_y$ and $\eta_z$ in the y-axis and z-axis directions become larger and the installation angle θ becomes closer to 45 degrees. FIGS. 3A and 3B depict installation angle θ dependency of MgO:PPLN of a degree of polarization of laser beams in the c-axis direction after passing through MgO:PPLN. A calculation is performed here, designating the intensity transmission factor in a single pass of laser beams in the z-axis and y-axis directions, respectively, as $\eta_z$=0.9 (that is, assuming that a wavelength conversion rate of the single pass in the z-axis direction is 10%), and $\eta_y$=1.0. The degree of polarization in the c-axis direction is defined by the strength of polarization in the c-axis direction with respect to a sum of strengths of polarization in the c-axis direction and the a-axis direction. The strength of polarization in each axial direction is proportional to a square of the field strength in the axial direction.

As shown in FIGS. 3A and 3B, in the case of the phase difference being 0 or $\pi$, the degree of polarization in the c-axis direction becomes the smallest when the installation angle $\theta$ of MgO:PPLN 131 is close to 45 degrees. As shown in FIG. 3A, when the installation angle $\theta$ of MgO:PPLN 131 is 10 degrees, the degree of polarization in the c-axis direction is 0.99964, and when the installation angle $\theta$ of MgO:PPLN 121 is 45 degrees, the degree of polarization in the c-axis direction is 0.99724. Further, shown in FIG. 3B, in the case of the phase difference being $\pi$, the degree of polarization in the c-axis direction becomes substantially zero when the installation angle $\theta$ is 45 degrees.

Next, the wavelength dependency of the degree of polarization of laser beams in a case that a loss occurs when laser beams pass through a plurality of materials is obtained by using the Jones' matrix. Jones' matrix J at the time of inclining the z-axis of MgO:PPLN 131 by the angle $\theta$ is expressed by the following equation (8), where a rotating matrix of angle $\theta$ is designated as $R(\theta)$, and a phase difference between laser beams in the y-axis direction and laser beams in the z-axis direction of MgO:PPLN 131 is designated as $\alpha(=2\pi \cdot \Delta nL/\lambda)$.

$$J = R(\theta)\begin{pmatrix} \sqrt{\eta_z} & 0 \\ 0 & \sqrt{\eta_y} \end{pmatrix}\begin{pmatrix} e^{i\alpha/2} & 0 \\ 0 & e^{-i\alpha/2} \end{pmatrix} \quad (8)$$

$$\begin{pmatrix} \sqrt{\eta_z} & 0 \\ 0 & \sqrt{\eta_y} \end{pmatrix}\begin{pmatrix} e^{i\alpha/2} & 0 \\ 0 & e^{-i\alpha/2} \end{pmatrix} r(-\theta)$$

By using the Jones' matrix J in the equation (8), the electric field components ($E_c'$, $E_a'$) at the time of entering into Nd:YVO$_4$ 121 after having traveled back and force in the nonlinear optical material (MgO:PPLN) 131 is obtained as shown in the following equation (9).

$$\begin{pmatrix} E_c' \\ E_a' \end{pmatrix} = J\begin{pmatrix} E_z \\ E_y \end{pmatrix} \quad (9)$$

Figure 4A:
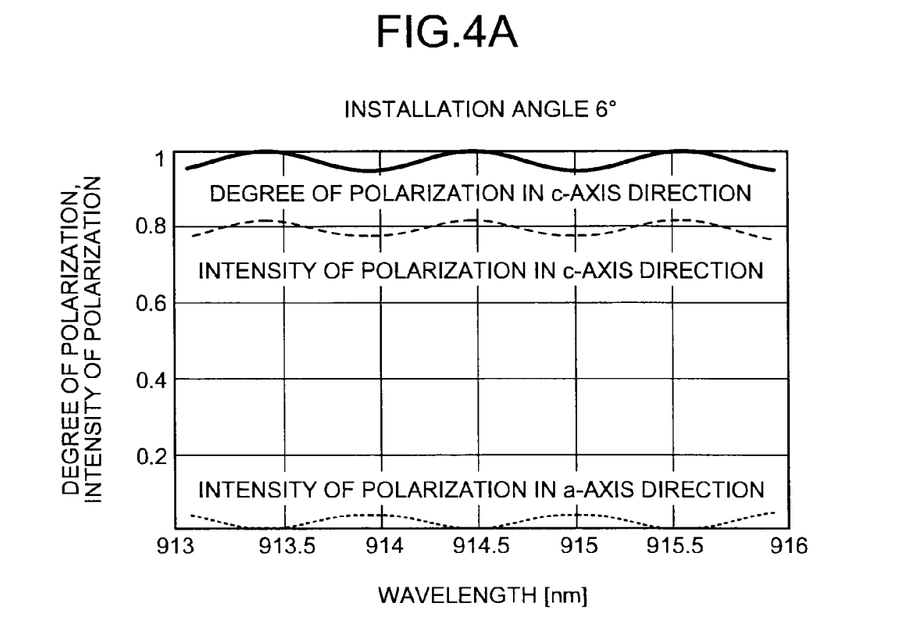
FIG. 4A depicts a wavelength dependency of a strength of polarization in a-axis and c-axis directions and a degree of polarization in the c-axis direction of laser beams after passing through MgO:PPLN.
Figure 4B:
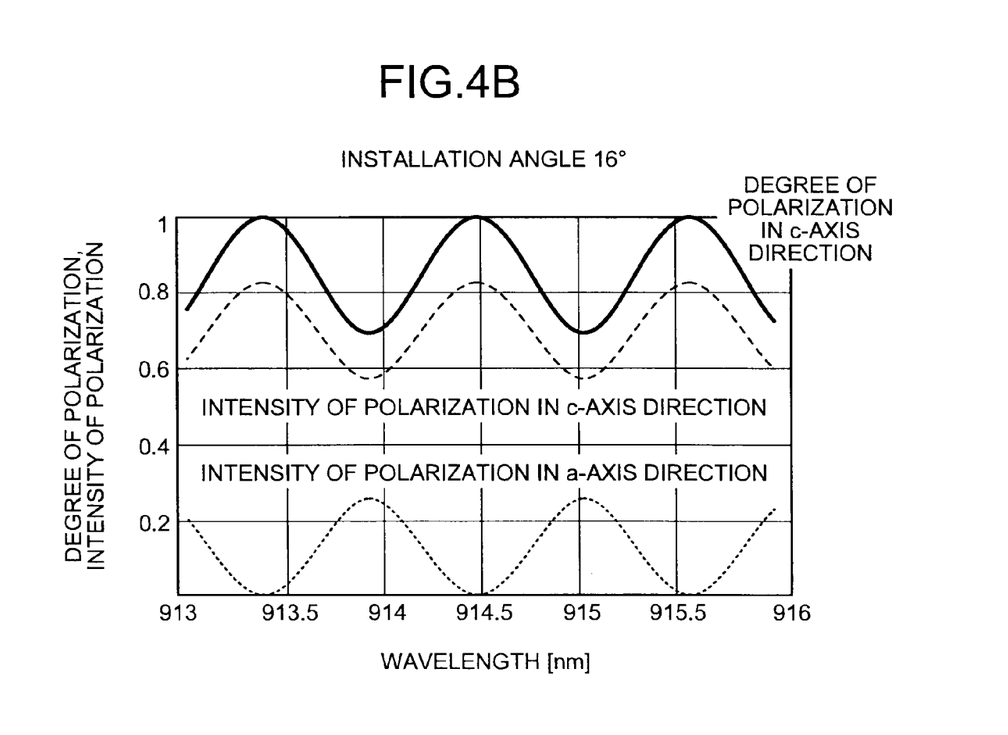
FIG. 4B depicts a wavelength dependency of a strength of polarization in the a-axis and c-axis directions and a degree of polarization in the c-axis direction of laser beams after passing through MgO:PPLN.
Figure 4C:
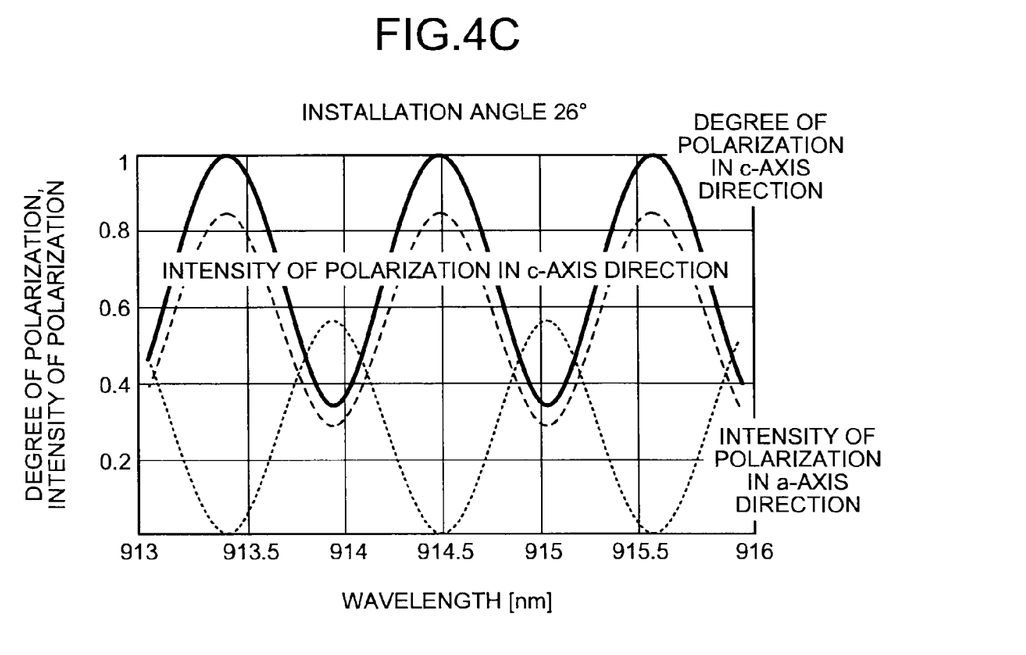
FIG. 4C depicts a wavelength dependency of a strength of polarization in the a-axis and c-axis directions and a degree of polarization in the c-axis direction of laser beams after passing through MgO:PPLN.
Figure 4D:
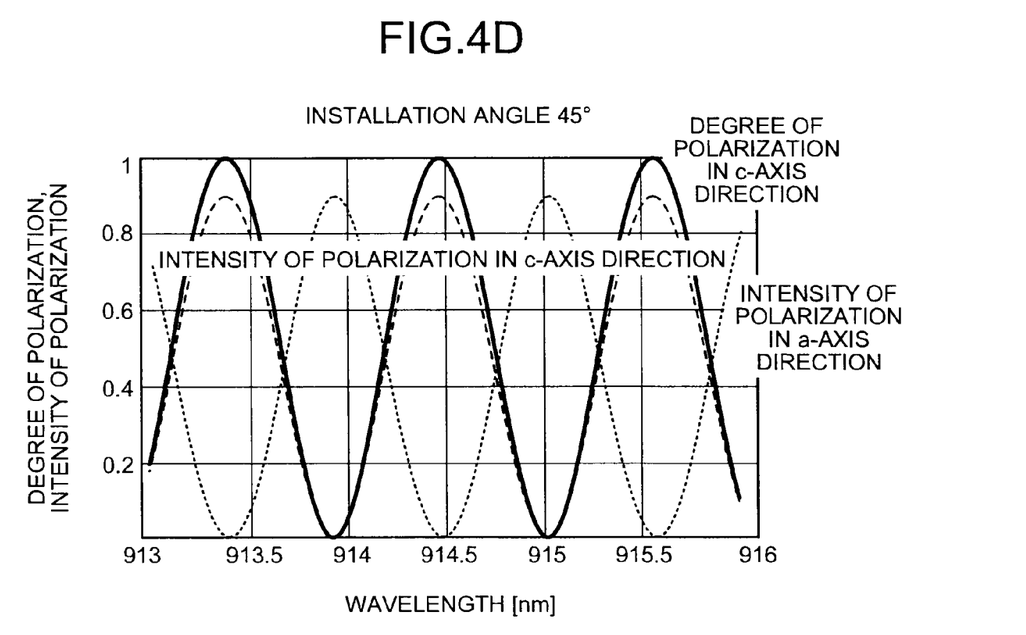
FIG. 4D depicts a wavelength dependency of a strength of polarization in the a-axis and c-axis directions and a degree of polarization in the c-axis direction of laser beams after passing through MgO:PPLN.

FIGS. 4A to 4D depict the wavelength dependency of the strength of polarization in the a-axis and c-axis directions and the degree of polarization in the c-axis direction of laser beams after passing through MgO:PPLN. A calculation is performed by using the equation (9), designating the intensity transmission factor in a single pass of laser beams in the z-axis and y-axis directions, respectively, as $\eta_z=0.9$ (that is, assuming that the wavelength conversion rate of the single pass in the z-axis direction is 10%), and $\eta_y=1.0$, and assuming that $E_z=1$ and $E_x=0$. FIG. 4A depicts a case that the installation angle of MgO:PPLN 131 is 6 degrees, FIG. 4B depicts a case that the installation angle of MgO:PPLN 131 is 16 degrees, FIG. 4C depicts a case that the installation angle of MgO:PPLN 131 is 26 degrees, and FIG. 4D depicts a case that the installation angle of MgO:PPLN 131 is 45 degrees.

As shown in the degree of polarization in the c-axis direction in FIGS. 4A to 4D, as the installation angle $\theta$ of MgO:PPLN 131 increases, the boundary between wavelengths in which a loss obtained by the equation (1) becomes the smallest is sharply marked. This is because the strength of polarization in the a-axis direction increases in a range between the wavelengths in which the loss obtained by the equation (1) becomes the smallest, and this part becomes a loss at the time of entering into the solid-state laser element 12.

The largest degree of polarization in the c-axis direction is, respectively, 0.9999, 0.9991, 0.9982, and 0.9972 when the installation angle is 6 degrees, 16 degrees, 26 degrees, and 45 degrees. Further, a wavelength width when the degree of polarization in the c-axis direction of laser beams entering into Nd:YVO$_4$ 121 is 90% (polarization loss is 10%) is, respectively, 0.5 nanometer, 0.3 nanometer, and 0.2 nanometer when the installation angle is 16 degrees, 26 degrees, and 45 degrees.

Figure 5A:
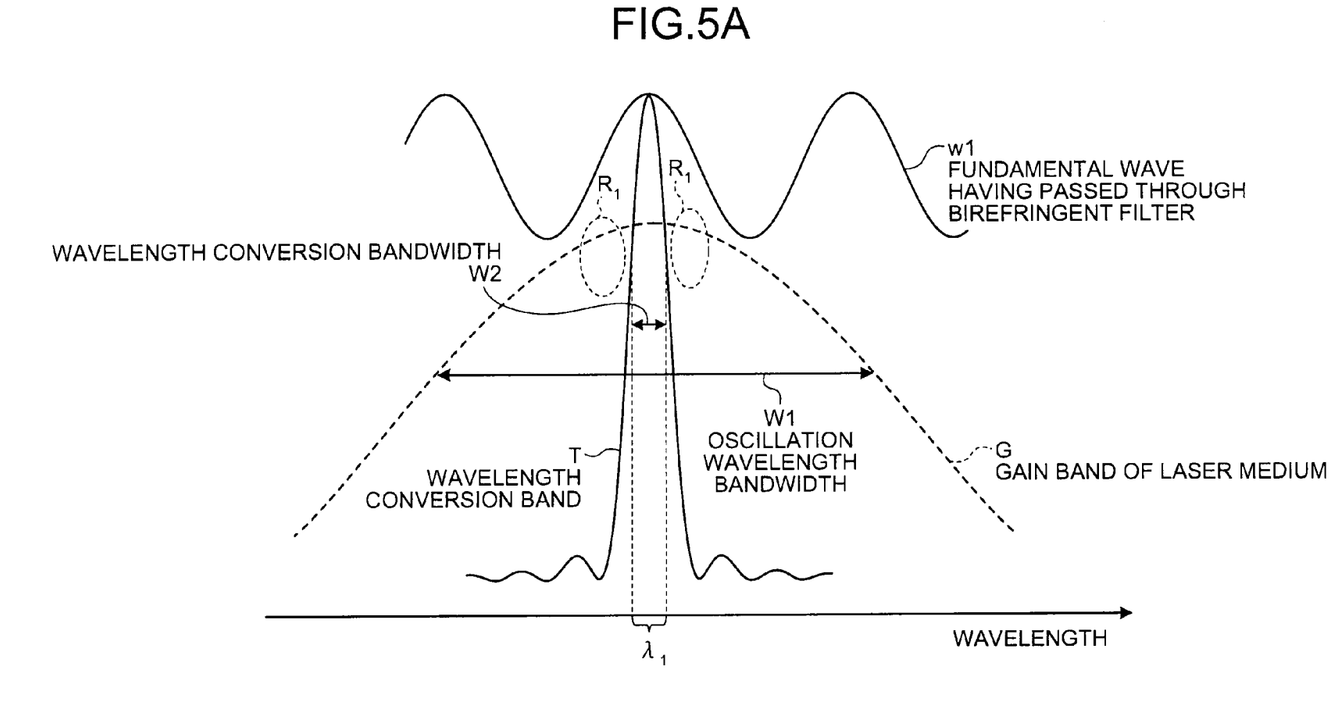
FIG. 5A is a schematic diagram of a relation between a gain shape with respect to a wavelength of a fundamental wave and a gain band of a laser medium.

FIGS. 5A and 5B are schematic diagrams of a relation between a shape of the gain with respect to the wavelength of the fundamental wave and a gain band of the laser medium. When a fundamental wave w1 having passed through the birefringent filter has a shape of the gain as shown in FIG. 5A, when laser oscillation occurs at a wavelength position of the fundamental wave w1 overlapping on a peak of a gain band G of the laser medium 121 (hereinafter, "peak overlapping position") $\lambda_1$, a second harmonic is generated by the wavelength conversion-filter element 13, thereby increasing a loss at the peak overlapping position $\lambda_1$. At this time, because the gain of the fundamental wave w1 exceeds the loss generated by the birefringent filter also in a region $R_1$ outside of the peak overlapping position $\lambda_1$, laser oscillation occurs, thereby causing laser oscillation outside a wavelength conversion band T. Laser beams laser-oscillated at outside the wavelength conversion band T are not wavelength-converted, thereby decreasing wavelength conversion efficiency of the wavelength conversion-filter element 13.

Figure 5B:
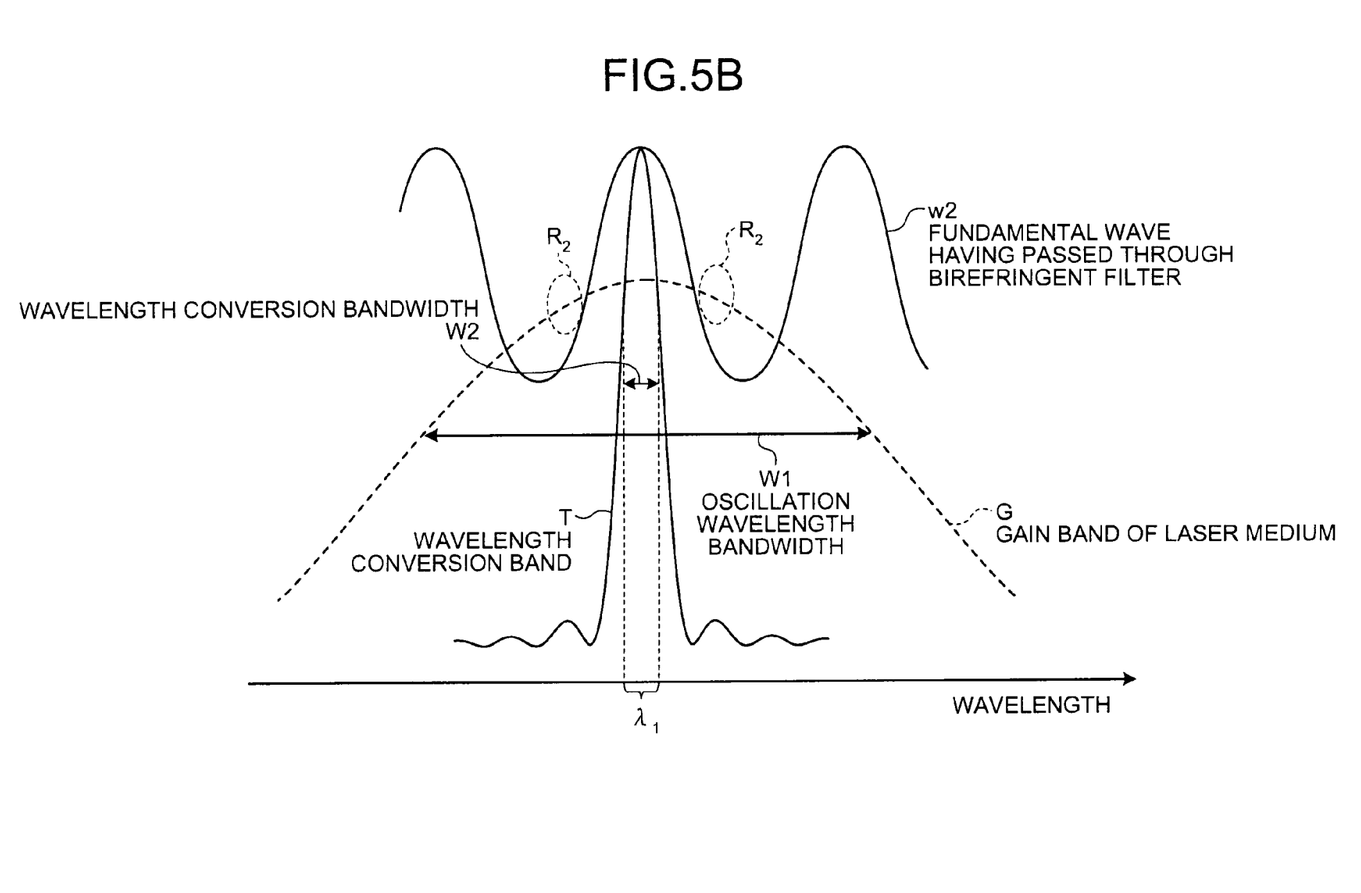
FIG. 5B is a schematic diagram of a relation between a gain shape with respect to a wavelength of a fundamental wave and a gain band of a laser medium.

On the other hand, when a fundamental wave w2 having passed through the birefringent filter has a shape of the gain as shown in FIG. 5B, a gain of the fundamental wave w2 falls below the loss generated by the birefringent filter in a region $R_2$ near the outside of the peak overlapping position $\lambda_1$, and an oscillation wavelength width of the fundamental wave w2 is narrowed. Therefore, laser oscillation occurs at the peak overlapping position $\lambda_1$ to generate the second harmonic due to wavelength conversion by the wavelength conversion-filter element 13. Even if the loss increases at the peak overlapping position $\lambda_1$, laser oscillation does not occur with a wavelength in a region $R_2$ in which the gain of the fundamental wave w2 near the outside of the peak overlapping position $\lambda_1$ falls below the gain band G of the laser medium.

That is, it is desired to determine the installation angle $\theta$ of MgO:PPLN 131 so that the shape of the gain of the fundamental wave w2 generates laser oscillation in a region where the gain band G of the laser medium 121 and the wavelength conversion band T overlap on each other and in an adjacent region thereof, but does not generate laser oscillation with a wavelength outside the region. More specifically, it is desired to have a shape of the fundamental wave w2 at the time of the installation angle $\theta$ being as small as possible, of the installation angles $\theta$ at which the gain of the fundamental wave w2 intersects the gain band G of the laser medium near a point of intersection between the wavelength conversion band T and the gain band G of the laser medium. The installation angle $\theta$ having such a shape of the gain of the fundamental wave is different according to a material and a length of the wavelength conversion-filter element 13 to be used. Therefore, the most appropriate installation angle $\theta$ needs to be determined for each of the wavelength conversion-filter element 13 to be used. In this manner, the bandwidth of laser beams (fundamental waves) entering into the solid-state laser element 12 can be narrowed.

In FIGS. 4A to 4B, a peak position with a minimum loss is 914.5 nanometers deviated from 914 nanometers, which is a center of the wavelength conversion bandwidth. This is because a calculation is performed, designating a length of the nonlinear optical material 131 of the wavelength conversion-filter element 13 in the direction of the optical axis R as 4.0 millimeters. When the oscillation wavelength of the fundamental wave is set to 914 nanometers, only the length of the nonlinear optical material 131 in the direction of the optical axis R needs to be changed. Further, when the wavelength conversion laser device 10 is constituted by designating the length of the nonlinear optical material 131 in the direction of the optical axis R as 4.0 millimeters, the peak position of the fundamental wave having passed through MgO:PPLN 131 and the position of the wavelength conversion band of the nonlinear optical material 131 change according to a temperature change, and thus the peak positions thereof can be matched with each other by a temperature adjustment.

For example, the wavelength conversion laser device 10 shown in FIG. 1 is held on a heat sink, although not shown, and includes a temperature detector that detects the temperature of a thermistor and a thermocouple fitted to the heat sink, a heating and cooling unit such as a Peltier element or a heater that heats or cools the wavelength conversion laser device 10 to a predetermined temperature, and a temperature controller that controls the heating and cooling unit so that the temperature of the heat sink (the wavelength conversion laser device) detected by the temperature detector becomes the predetermined temperature.

Figure 6:
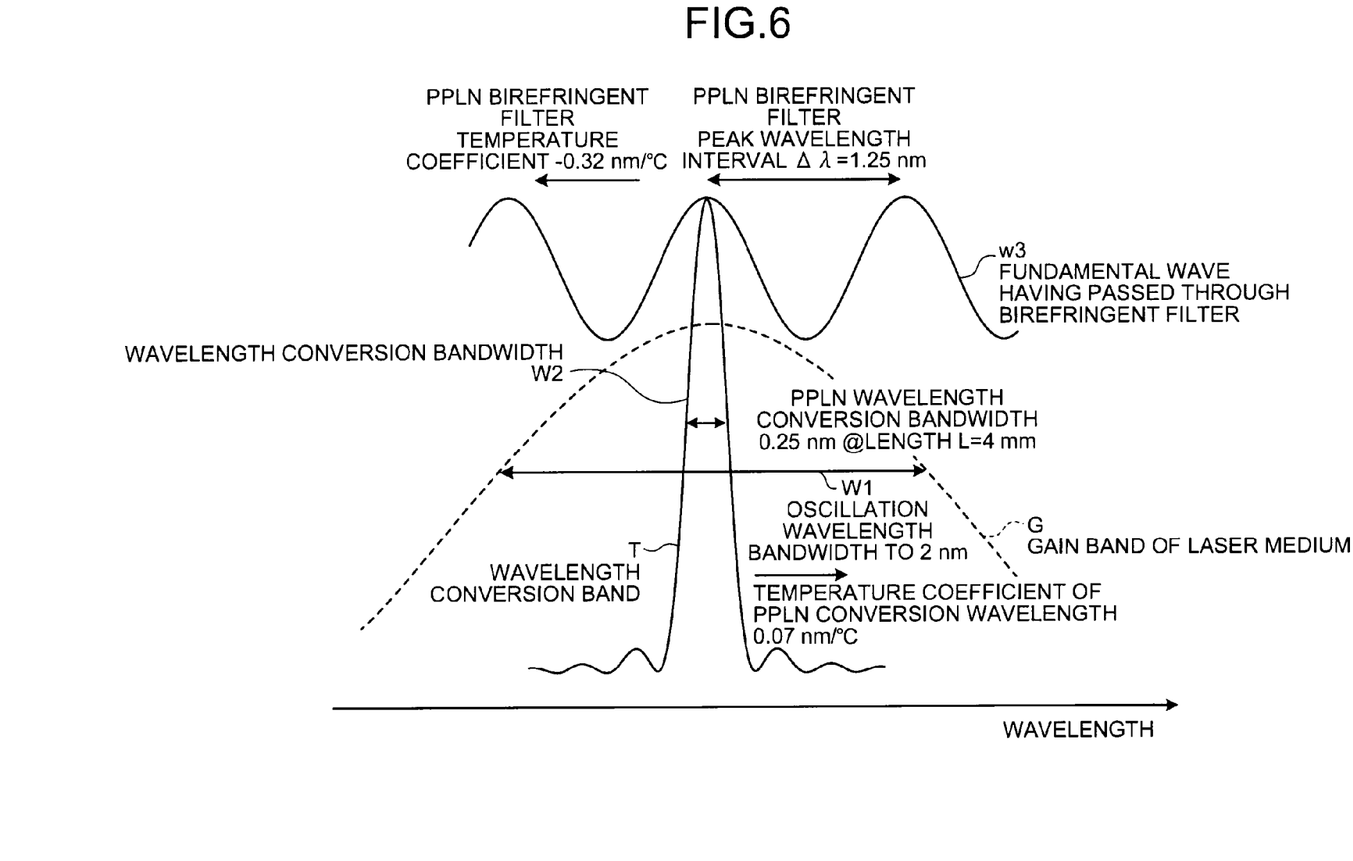
FIG. 6 is a schematic diagram of a shift of a wavelength conversion band and a fundamental wave in a nonlinear optical material caused by a temperature change.

FIG. 6 is a schematic diagram of a shift of the wavelength conversion band and the fundamental wave in the nonlinear optical material caused by a temperature change. An example in which the length of the optical axis R is 4.0 millimeters, and MgO:PPLN 131 is used as the nonlinear optical material 131 is explained. When the temperature is increased, the wavelength conversion band T (wavelength conversion bandwidth W2) changes at a rate of +0.07 nm/° C. On the other hand, the peak position of a fundamental wave w3 that travels back and forth in MgO:PPLN 131 (output from the birefringent filter) changes at a rate of −0.32 nm/° C. As calculated in the equation (1), the wavelength interval Δλ with smallest loss is 1.25 nanometers. Therefore, the peak of the wavelength conversion band T and a peak wavelength of the gain of the fundamental wave w3 output by the birefringent filter match each other for every 1.25/(0.32−0.07)=5° C. Further, a shift of the wavelength conversion band T in MgO:PPLN 131 due to a temperature change by 5° C. is 0.35 nanometer (=0.07 nm/° C.×5° C.), which is smaller than about 2 nanometers as an oscillation wavelength bandwidth W1 of the gain band G of the laser medium 121. Therefore, the peak wavelength having the smallest loss of the fundamental wave w3 output by the birefringent filter within the oscillation wavelength bandwidth W1 can be made to match the peak of the wavelength conversion band T by a temperature adjustment. During an output of laser beams, the temperature controller controls heating or cooling by the heating and cooling unit based on the temperature detected by the temperature detector so that the predetermined temperature is achieved.

According to the first embodiment, the nonlinear optical material 131 that functions as the wavelength conversion element is formed of the optically uniaxial crystal, and the optic axis thereof is inclined by the predetermined angle with respect to the crystalline axis of the laser medium 121 within the plane vertical to the optical axis R. Accordingly, the nonlinear optical material 131 also functions as the birefringent filter, and can limit the oscillation wavelength band of the fundamental wave that passes through the nonlinear optical material 131 and enters into the solid-state laser element 12. As a result, the wavelength conversion efficiency of the wavelength conversion-filter element 13 can be increased. Further, there is also an effect such that the oscillation wavelength band of laser beams can be limited without increasing the number of parts.

Second Embodiment

Figure 7:
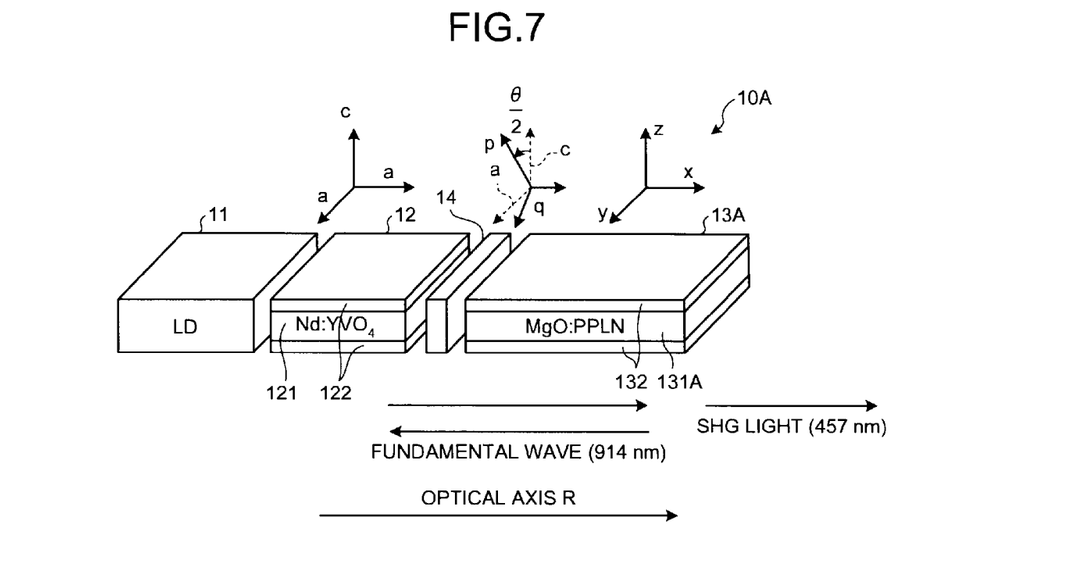
FIG. 7 is a perspective view schematically depicting a configuration of a wavelength conversion laser device according to a second embodiment of the present invention.

FIG. 7 is a perspective view schematically depicting a configuration of the wavelength conversion laser device according to a second embodiment of the present invention. A wavelength conversion laser device 10A has a configuration in which a wavelength conversion element 13A having a nonlinear optical material 131A arranged in such a manner that the z-axis (crystalline axis and optic axis) is not inclined with respect to the c-axis (polarization direction) of the solid-state laser element 12 is used instead of the wavelength conversion-filter element 13, and a ½ wavelength plate 14 that functions as the birefringent filter is inserted between the solid-state laser element 12 and the wavelength conversion element 13A, in the configuration of the first embodiment. In this case, as in the first embodiment, to limit the wavelength band of the fundamental wave entering into the solid-state laser element 12, only an optic axis p of the ½ wavelength plate 14 needs to be inclined by a predetermined angle within a plane vertical to the optical axis R with respect to the polarization direction (crystalline axis c of the laser medium 121) of the solid-state laser element 12. However, to achieve the same effect as that of the first embodiment, when MgO:PPLN 131 is inclined by the installation angle θ, only the ½ wavelength plate 14 needs to be inclined by θ/2. In FIG. 7, constituent elements identical to those in the first embodiment are denoted by like reference letters or numerals, and explanations thereof will be omitted. Further, because the operation of the wavelength conversion laser device 10A according to the second embodiment is identical to that of the first embodiment, explanations thereof will be omitted.

According to the second embodiment, because the optic axis p of the ½ wavelength plate 14 is inclined by the predetermined angle with respect to the crystalline axis c of the laser medium 121 within the plane vertical to the optical axis R, the wavelength band of the fundamental wave entering into the solid-state laser element 12 can be limited. As a result, the wavelength conversion efficiency of the wavelength conversion element 13A can be increased. Further, although the number of parts is increased, the ½ wavelength plate 14 has a size in the direction of the optical axis as small as several tens of micrometers and can suppress an increase in size of the wavelength conversion laser device 10 due to an addition of the parts, as compared with a case that parts of a millimeter order are added.

Third Embodiment

Figure 8:
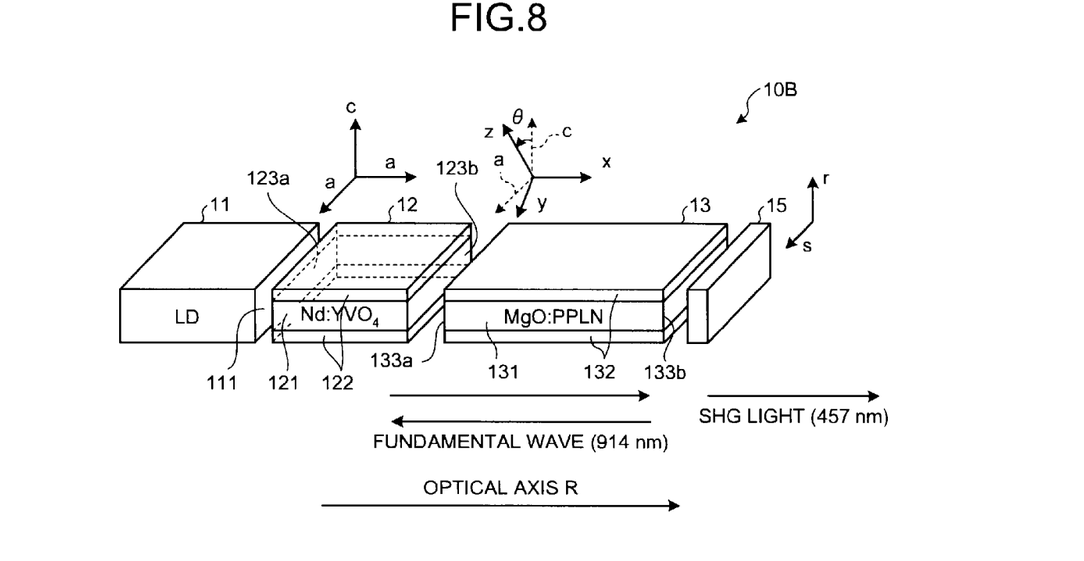
FIG. 8 is a perspective view schematically depicting a configuration of a wavelength conversion laser device according to a third embodiment of the present invention.

FIG. 8 is a perspective view schematically depicting a configuration of the wavelength conversion laser device according to a third embodiment of the present invention. A wavelength conversion laser device 10B has a configuration in which a ¼ wavelength plate 15 is provided on a second-harmonic output side of the wavelength conversion-filter element 13, in the configuration of the first embodiment. The ¼ wavelength plate 15 is arranged so that an optical axis R thereof is in the same direction as the c-axis (polarization direction) of the solid-state laser element 12. However, the facet 133b on the second harmonic output side of the wavelength conversion-filter element 13 is processed to transmit both the fundamental wave and the second harmonic, and an optical film that totally reflects the fundamental wave and transmits the second harmonic is formed on a facet 151 of the ¼ wavelength plate 15. Constituent elements identical to those in the first embodiment are denoted by like reference letters or numerals, and explanations thereof will be omitted.

Figure 9:
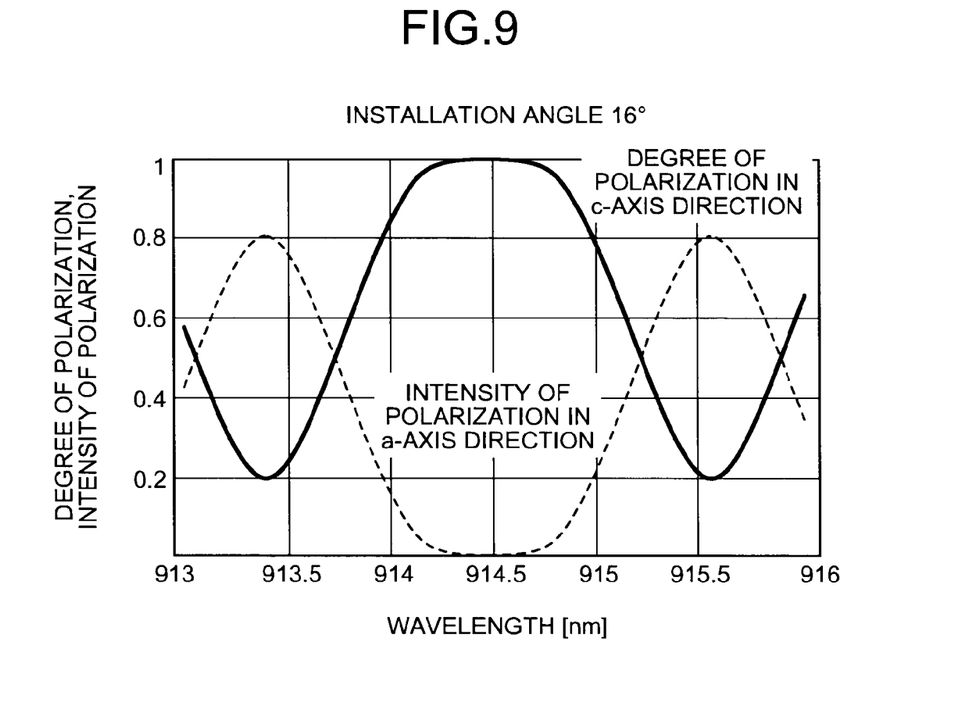
FIG. 9 depicts wavelength dependency of an intensity of polarization in an a-axis direction and a degree of polarization in a c-axis direction of laser beams after passing through MgO:PPLN and a ¼ wavelength plate.

FIG. 9 depicts wavelength dependency of an intensity of polarization in the a-axis direction and the degree of polarization in the c-axis direction of laser beams after passing through MgO:PPLN and a ¼ wavelength plate. As in the case of FIGS. 4A to 4D, a calculation is performed by designating the intensity transmission factor in a single pass of laser beams in the z-axis and y-axis directions as $\eta_z$=0.9 (that is, assuming that the wavelength conversion rate of the single pass in the z-axis direction is 10%), and $\eta_y$=1.0, respectively, and assuming that the installation angle θ of MgO:PPLN 131 is 16 degrees. As a comparison object, FIG. 4B depicts the wavelength dependency of the intensity of polarization in the a-axis and c-axis directions and the degree of polarization in the c-axis direction of laser beams after passing through MgO:PPLN in a case that the ¼ wavelength plate 15 is not provided.

As shown in FIG. 9, when the ¼ wavelength plate 15 is provided, a peak interval of a shape of the gain with respect to the wavelength of the fundamental wave output from the birefringent filter (wavelength conversion-filter element 13) is doubled as compared with a case that the ¼ wavelength plate 15 is not provided as shown in FIG. 4B, and the peaks are smoothed. Therefore, by providing the ¼ wavelength plate 15, an oscillation band of the fundamental wave can be widened in the wavelength conversion band.

According to the third embodiment, the z-axis (optic axis) of the wavelength conversion-filter element 13 is arranged, inclined with respect to the c-axis of the laser medium 121 in the plane vertical to the optical axis R and the ¼ wavelength plate 15 is provided on the output side of the second harmonic of the wavelength conversion-filter element 13. Accordingly, the peaks of the fundamental wave output from the wavelength conversion-filter element 13 can be smoothed, and the wavelength band of the fundamental wave can be widened in the wavelength conversion band. As a result, efficient wavelength conversion can be performed. Further, in FIG. 7 in the second embodiment, the ¼ wavelength plate can be provided similarly on the output side of the second harmonic of the wavelength conversion element 13A to achieve the same effect.

In the second and third embodiments, by controlling the temperature of the wavelength conversion laser device as in the first embodiment, the peak wavelength having the smallest loss of the fundamental wave output by the birefringent filter and the peak of the wavelength conversion band can be made to match each other in the oscillation wavelength bandwidth.

Furthermore, in the above explanations, an example in which the optic axis (c-axis) of the laser medium 121 of the solid-state laser element 12 is provided in the thickness direction of the tabular laser medium 121 has been explained. However, the optic axis (c-axis) of the laser medium 121 can be provided in any direction so long as the a-axis is arranged parallel to the optical axis R, and the optic axis (c-axis) of the laser medium 121 is present in the plane vertical to the optical axis R. Also in this case, the optic axis (c-axis) of the nonlinear optical material 131 of the wavelength conversion-filter element 13 or the wavelength conversion element 13A or the optic axis p of the ½ wavelength plate can be arranged, inclined by a predetermined angle with respect to the optic axis (c-axis) of the laser medium 121.

INDUSTRIAL APPLICABILITY

As described above, the wavelength conversion laser device according to the present invention is useful when laser beams having a predetermined wavelength are efficiently converted to second harmonics.

The invention claimed is:
1. A wavelength conversion laser device, comprising:
a solid-state laser element having a waveguide structure including a laser medium to amplify laser beams by providing a gain generated due to absorption of pump light to the laser beams and to output a linearly polarized fundamental wave; and
a wavelength conversion element having a waveguide structure including a nonlinear, birefringent optical material in which an optic axis is arranged, the optic axis being inclined by a predetermined angle with respect to an optic axis of the laser medium in a plane vertical to an optical axis of the laser beams and selected such that a shape of a gain of the fundamental wave having passed through the birefringent optical material generates laser oscillation in a region where a gain band of the laser medium and a wavelength conversion band overlap each other, the wavelength conversion element being configured to convert a part of the fundamental wave output from the solid-state laser element to a second harmonic and to differentiate a polarization state of the fundamental wave having passed through the wavelength conversion element and having entered into the solid-state laser element from the linear polarization output from the solid-state laser element; and
an optical resonator structure including the solid-state laser element and the wavelength conversion element, the optical resonator structure being configured to resonate the fundamental wave and to output a second harmonic from the wavelength conversion element.

2. The wavelength conversion laser device according to claim 1, further comprising a ¼ wavelength plate in which an optic axis thereof is arranged in a same direction as the optic axis of the laser medium, on a side of the wavelength conversion element that outputs the second harmonic.

3. A wavelength conversion laser device, comprising:
a solid-state laser element having a waveguide structure including a laser medium to amplify laser beams by providing a gain generated due to absorption of pump light to the laser beams and to output a linearly polarized fundamental wave; and
a wavelength conversion element having a waveguide structure including a nonlinear, birefringent optical material in which an optic axis is arranged, the wavelength conversion element being configured to convert a part of the fundamental wave output from the solid-state laser element to a second harmonic and to differentiate a polarization state of the fundamental wave having passed through the wavelength conversion element and having entered into the solid-state laser element from the linear polarization output from the solid-state laser element,
an optical resonator structure including the solid-state laser element and the wavelength conversion element, the optical resonator structure being configured to resonate the fundamental wave and to output a second harmonic from the wavelength conversion element; and
a ½ wavelength plate arranged between the solid-state laser element and the wavelength conversion element, an optic axis thereof being inclined by a non-zero predetermined angle with respect to an optic axis of the laser medium in a plane vertical to an optical axis of the laser beams.

4. The wavelength conversion laser device according to claim 3, further comprising a ¼ wavelength plate in which an optic axis thereof is arranged in a same direction as the optic axis of the laser medium, on a side of the wavelength conversion element that outputs the second harmonic.

5. The wavelength conversion laser device according to claim 1, wherein the predetermined angle is selected such that the shape of the gain of the fundamental wave having passed through the birefringent optical material generates laser oscillation in the region where the gain band of the laser medium and the wavelength conversion band overlap each other and in an adjacent region thereof, but does not generate laser oscillation with a wavelength outside the region.

6. The wavelength conversion laser device according to claim 1, wherein the predetermined angle is selected as a smallest angle among angles at which the gain of the fundamental wave intersects the gain band of the laser medium near a point of intersection between the wavelength conversion band and the gain band of the laser medium.

* * * * *

UNITED STATES PATENT AND TRADEMARK OFFICE
CERTIFICATE OF CORRECTION

| | | |
|---|---|---|
| PATENT NO. | : 8,073,024 B2 | Page 1 of 1 |
| APPLICATION NO. | : 12/671458 | |
| DATED | : December 6, 2011 | |
| INVENTOR(S) | : Takayuki Yanagisawa et al. | |

It is certified that error appears in the above-identified patent and that said Letters Patent is hereby corrected as shown below:

On the title page, Item (73), the Assignee's name is incorrect. Item (73) should read:

-- (73) Assignee: Mitsubishi Electric Corporation, Tokyo (JP) --

Signed and Sealed this
Thirty-first Day of January, 2012

David J. Kappos
*Director of the United States Patent and Trademark Office*